Dec. 25, 1945.   A. L. PARKER ET AL   2,391,505
THREE-WAY VALVE
Filed May 29, 1944
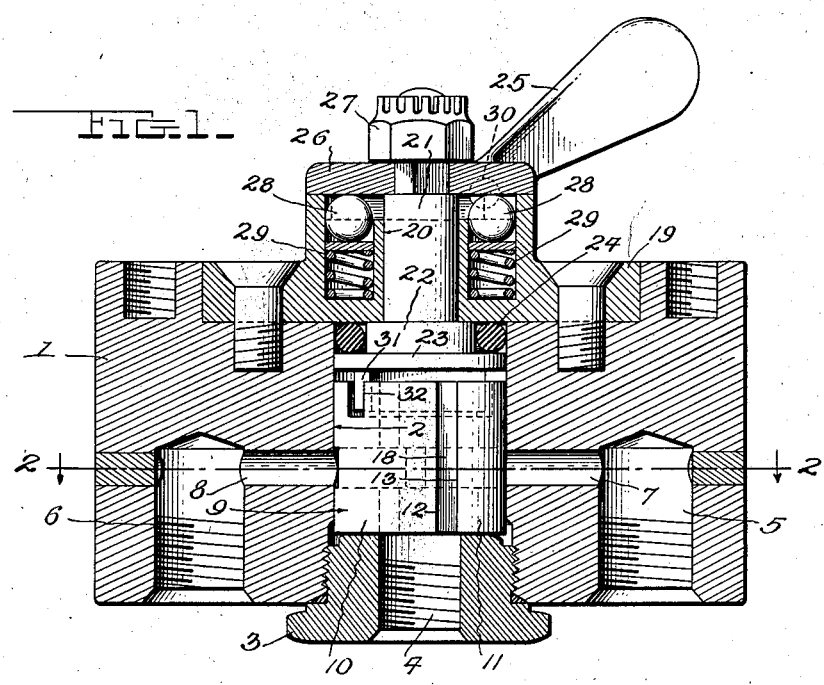
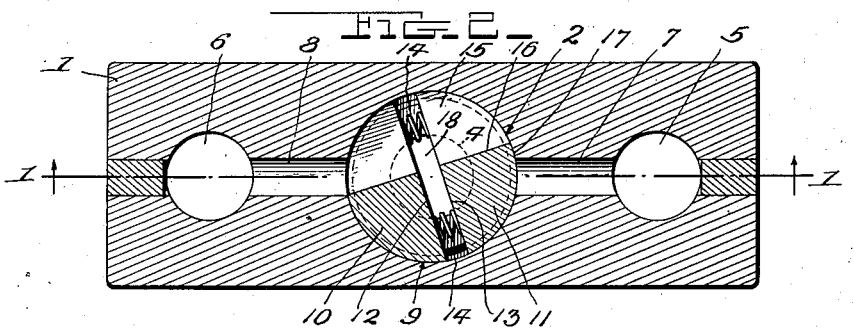
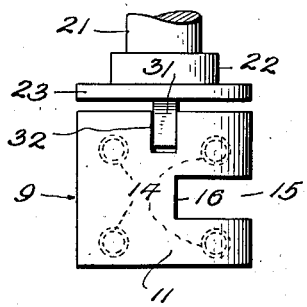
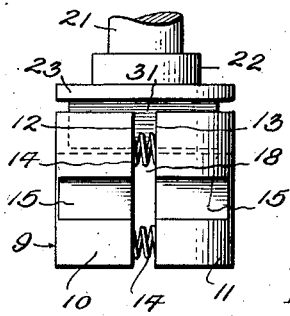
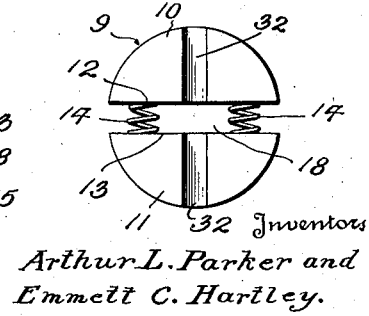
Inventors
Arthur L. Parker and
Emmett C. Hartley.
By Mason, Porter and Diller
Attorneys Patented Dec. 25, 1945

2,391,505

UNITED STATES PATENT OFFICE 2,391,505

THREE-WAY VALVE

Arthur L. Parker and Emmett C. Hartley, Cleveland, Ohio, assignors to The Parker Appliance Company, Cleveland, Ohio, a corporation of Ohio Application May 29, 1944, Serial No. 537,936

3 Claims. (Cl. 251—95)

The invention relates to new and useful improvements in three-way valve structures, which while capable of other uses, is particularly adapted for connecting a place of use with two different sources for creating a vacuum.

An object of the invention is to provide a valve of few parts which may be used selectively for connecting two different sources for creating a vacuum to a place of use.

A further object of the invention is to provide a valve of the above type wherein a valve rotor is selectively connected to the sources for creating a vacuum and is at all times connected to the source of use.

A still further object of the invention is to provide a valve of the above type wherein the valve rotor is composed of two spaced segments of a cylinder shaped to conform to the cylindrical wall of the valve chamber and wherein said segments have a port extending axially thereof and connected to a port extending transversely thereof which last-named port may be selectively connected to the sources for creating a vacuum.

These and other objects will in part be obvious and will in part be hereinafter more fully disclosed.

In the drawing which shows by way of illustration one embodiment of the invention, Figure 1 is a longitudinal sectional view through the valve casing in a plane containing the axis of the rotor and on the line indicated at 1—1 in Figure 2;

Figure 2 is a transverse sectional view on the line 2—2 of Figure 1;

Figure 3 is a detail showing the rotor as viewed from the cylindrical face of one section and showing the means for connecting the same to the stem for rotating the same;

Figure 4 is a view of the rotor and its operating means showing the two segments and the transverse port in full view;

Figure 5 is a top plan view of the rotor.

The improved three-way valve includes a casing 1 which is one solid rectangular block. Extending through the valve casing intermediate the ends thereof is a cylindrical valve chamber 2. Threaded into the lower end of the passage through the valve casing which forms the valve chamber is an adapter 3. The adapter is provided with a port 4 therethrough which is adapted to be connected with the place of use.

At one side of the cylindrical valve chamber is a passage which leads into the casing block and will be referred to hereinafter as a port adapted to be connected to a source for creating a vacuum. This port is indicated at 5 in the drawing. At the opposite end of the valve casing is a similar port 6 which is adapted to be connected to a separate and independent source for creating a vacuum. Extending longitudinally through the valve casing 1 is a transverse passage providing a port 7 which connects the port 5 to the cylindrical valve chamber and a port 8 which connects the port 6 to the valve chamber. These ports 7 and 8 enter the valve chamber at diametrically opposite sides thereof and a center line through these ports passes through the center of the valve chamber.

Disposed in the valve chamber is a rotor 9. Said rotor is made of two sections, 10 and 11. Each section is a segment of a cylinder. The curved side of the segment conforms to the cylindrical wall of the valve chamber. The straight sides of the segment indicated respectively at 12 and 13 are parallel and spaced from each other. Disposed between the two segments are four springs indicated at 14. These springs are placed in suitable recesses in the segments so that they are supported and they operate to force the segments against the walls of the valve chamber, making a tight seal contact between the rotor and the wall of the valve chamber. The segments are cut away so as to provide a transverse port 15. The inner wall 16 of this transverse port 15 is parallel to and offset to one side of a line passing centrally through the longitudinal center of the valve chamber and the rotating axis of the rotor. This placing of the wall ensures that when the rotor is in the position shown in Figure 2, the port 7 will be completely closed. The portion 17 of the rotor segment 11 laps by the port so that this segment laps the port 7 on all sides and completely closes the same. At the opposite side the wall 16 is disposed relative to the port 6 so that the port is fully opened.

The segments, as above noted, are spaced and this space between the segments indicated at 18 in the drawing, serves as a port connecting the port of use 4 selectively with the transverse ports 7 and 8 and thus with the ports 5 and 6 which lead to the source for creating a vacuum.

The valve casing 1 is provided with a recess at its upper face in which is set a cap 19. This cap has a bore 20 therethrough through which extends a valve stem 21. This valve stem 21 is provided with an enlarged head 22 which engages the under side of the cap 19. It is also provided with a flange 23 that extends all the way out to the wall of the valve chamber and thus provides a recess for a ring gasket 24. This ring gasket seals the valve chamber at its upper end.

Attached to the upper end of the valve stem is a handle 25. Said handle has a disk-shaped hub 26 with an irregular shaped opening therethrough which fits a similar irregular shape on the valve stem. A nut 27 fixes the handle to the valve stem.

Mounted in recesses in the cap 19 are balls 28 which are pressed by means of a spring 29 against the under face of the handle disk. There are small balls 30 rigidly secured to the handle disk and projecting therefrom which cooperate with the balls 28 in the positioning of the valve in a desired set position. This indexing mechanism is shown, described and claimed in detail in a copending application, Serial No. 537,935, filed of even date herewith, and further description is not thought necessary.

The valve stem on its lower face is provided with a rib 31 which is rectangular in cross section. This rib fits in a similarly shaped groove 32 formed in the rotor sections 10 and 11. When the stem is turned the rotor sections will be turned thereby through this rib and groove connection. The sections are free to move longitudinally of the rib and are only restrained in their movement by their contact with the wall of the valve chamber.

As stated above, the three-way valve is capable of various uses wherein it is desired to connect selectively one of two ports to an independent port. It is particularly adapted for use in an airplane construction. When so applied, the end ports 5 and 6 will be connected independently with different sources for creating a vacuum. The adapter port 4 will be connected to a flight instrument such as the turn and bank indicator. Normally the flight instrument is operated by the vacuum produced by the vacuum creating means to which the rotor is set for connection. In case the vacuum gives out, or the line leading therefrom is damaged or otherwise out of order, the valve can be quickly turned so as to connect the other source for creating a vacuum to the flight instrument. When the valve is in the position shown in Figure 2, the port 4 is connected with the port 18 between the segments of the rotor and through the transverse port 15 to the port 8 and through the port 8 to the port 6 leading to a source for creating a vacuum. At this time the port 7 is completely closed by the valve sector 11 lapping the wall of the valve chamber all the way around the port 7. When the valve rotor is turned in a clockwise position, the port 8 will be closed and the port 7 connected in a similar manner to the port 4.

It is obvious that many changes may be made in the details of construction without departing from the spirit of the invention as set forth in the appended claims.

We claim:

1. The combination of a valve casing having a cylindrical valve chamber therein, a cap for closing the upper end of said chamber, a valve rotor disposed in said chamber, an operating stem extending through said cap and connected to said valve rotor for turning the same, said valve chamber being closed at its lower end by an adapter having a port therethrough, said valve casing having ports on opposite sides of the valve chamber connected by passages to the valve chamber at diametrically opposite points, said valve rotor comprising two segments of a cylinder, the outer faces of which conform to the cylindrical surface of the valve chamber, said segments having a transverse passage therethrough adapted to be selectively connected with the passage leading to the respective ports and said segments being spaced so as to provide a connecting passage extending longitudinally of the valve rotor to the port in the adapter.

2. The combination of a valve casing having a cylindrical valve chamber, a valve rotor disposed in said chamber comprising segments of a cylinder, the outer faces of which conform to the cylindrical surface of the valve chamber, said segments being spaced and forming therebetween a longitudinal port, springs disposed between said segments for forcing said segments into contact with the wall of the valve chamber, said valve casing having a port connected with the port between the segments and also having ports on opposite sides of the valve chamber connected by passages to the valve chamber at diametrically opposite points, said segments of the rotor having a transverse port disposed at right angles to the inner faces of the segments and at one side of the center of the valve chamber whereby said rotor may be selectively positioned so as to connect one or the other of the diametrically opposed passages to the port between the segments.

3. The combination of a valve casing having a cylindrical valve chamber, a valve rotor disposed in said chamber comprising segments of a cylinder, the outer faces of which conform to the cylindrical surface of the valve chamber, said segments being spaced and forming therebetween a longitudinal port, springs disposed between said segments for forcing said segments into contact with the wall of the valve chamber, said valve casing having a port connected with the port between the segments and also having ports on opposite sides of the valve chamber connected by passages to the valve chamber at diametrically opposite points, said segments of the rotor having a transverse port disposed at right angles to the inner faces of the segments and at one side of the center of the valve chamber whereby said rotor may be selectively positioned so as to connect one or the other of the diametrically opposed passages to the port between the segments, said rotor at the upper end thereof having a groove extending across the rotor at right angles to the inner faces of the segments, said valve casing having a cap, a stem extending through the cap and having a rib shaped in cross section to conform to the groove in the rotor and adapted to engage said groove for turning said rotor.

ARTHUR L. PARKER.
EMMETT C. HARTLEY.